United States Patent

[11] 3,622,773

| [72] | Inventor | Norman J. Schuster |
| | | Woodland Hills, Calif. |
| [21] | Appl. No. | 873,927 |
| [22] | Filed | Nov. 4, 1969 |
| [45] | Patented | Nov. 23, 1971 |
| [73] | Assignee | Litton Systems, Inc. |
| | | Beverly Hills, Calif. |

[54] LIGHTING SYSTEM FOR INSTRUMENTS
6 Claims, 5 Drawing Figs.

[52] U.S. Cl. .................................................. 240/8.16
[51] Int. Cl. .................................................. B60q 3/04
[50] Field of Search.......................................... 240/8.16, 2.1, 9.5

[56] References Cited
UNITED STATES PATENTS
| 2,695,354 | 11/1954 | Neugass ........................ | 240/8.16 |
| 2,804,540 | 8/1957 | Columbus et al. ............ | 240/8.16 |

Primary Examiner—Louis R. Prince
Assistant Examiner—William A. Henry, II
Attorneys—Alan C. Rose, Ronald W. Reagin and Alfred B. Levine

ABSTRACT: A lighting system being useful for aircraft instrument panels is disclosed. The system includes a light source located between two surfaces which are coated with a flocking material to prevent light reflection from the surfaces. The light is transmitted through a refractor before impinging upon an instrument.

PATENTED NOV 23 1971 3,622,773
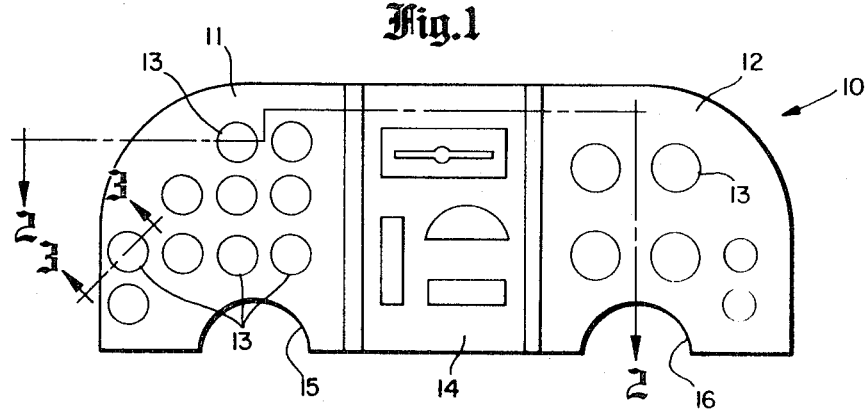
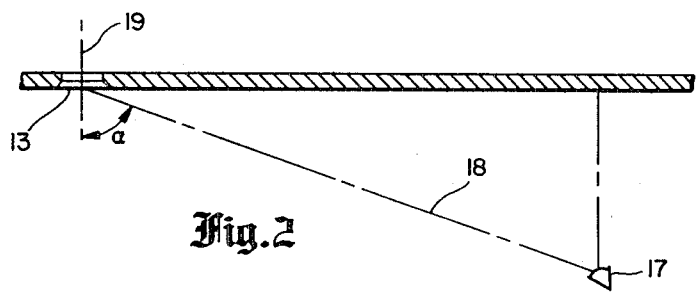
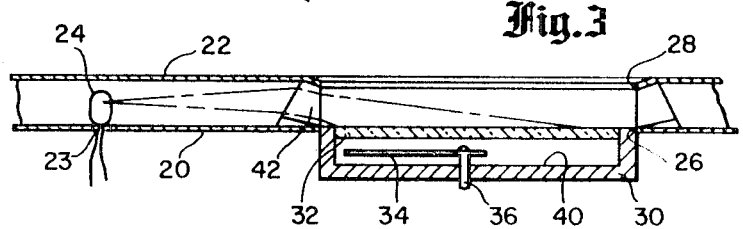
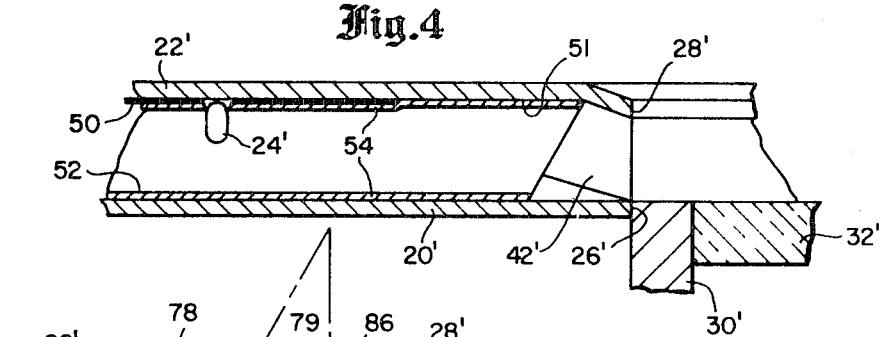
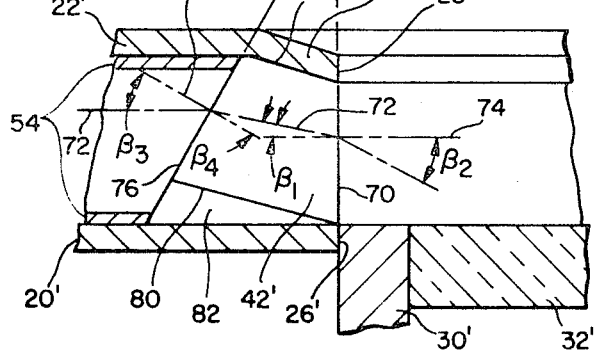
INVENTOR.
NORMAN J. SCHUSTER

LIGHTING SYSTEM FOR INSTRUMENTS

BACKGROUND OF THE INVENTION

1. Field of the Invention

The present invention relates to a lighting system and more particularly to an improved lighting system for instruments such as those used in aircraft instrument panels.

2. Description of the Prior Art

The prior art is replete with examples of improvements to the lighting system for instrument panels; for example U.S. Pat. No. 2,858,417, "Instrument Dial Illuminator" to Stevens et al., U.S. Pat. No. 2,695,354, "Instrument Panel Lighting" to Neugass, and U.S. Pat. No. 2,259,910 "Sealing and Illuminating Means for Indicating Instruments" to Rylsky. Much effort has been directed to evenly distribute light from a single point source to an instrument having a circular face. Efforts have also been expended attempting to reduce the amount of glare or reflected light from an instrument lens. Nevertheless, various reflections from the lens of an instrument have presented a continuing problem in environments where needless light reflections create safety hazards; such an environment is an aircraft cockpit. Satisfactory solutions to the problems of poor readability at certain angles caused by dark or dim spots on an instrument, of intense light reflection at relatively small angles from the normal to the face of an instrument, and of halo or ring effects about the peripheral portion of an instrument face have not yet been found. In addition, economic considerations remain important in most circumstances and especially for mass-produced items.

SUMMARY OF THE INVENTION

In accordance with the present invention, the above-mentioned deficiencies and problems have been greatly minimized or eliminated by the provision of a lighting system including a light source positionable adjacent a support plate having an opening for the viewing of an instrument in combination with a layer of nonlight-reflecting material such as flock positionable between said light source and said opening and a light-transmitting refractor for refracting light from said light source and for positioning about and conforming to said opening, the refractor having four surfaces in cross section.

An object of the present invention is to provide a lighting system which substantially reduces or eliminates various reflections associated with an instrument and which is simply constructed and economical.

BRIEF DESCRIPTION OF THE DRAWING

FIG. 1 is a front view of an instrument panel analogous to that which may be found in small aircraft.

FIG. 2 is a section view taken along line 2—2 of FIG. 1 and additionally diagrammatically illustrates the position of a viewer.

FIG. 3 is a side section view taken along line 3—3 of FIG. 1 illustrating a preferred embodiment of a lighting system.

FIG. 4 is a partial, modified and enlarged view of FIG. 3.

FIG. 5 is a partial enlarged view of FIG. 4.

DESCRIPTION OF THE PREFERRED EMBODIMENT

Turning now to the drawing wherein like numerals designate like or corresponding parts throughout the several views, there is shown in FIG. 1 a view of an instrument panel 10 such as those commonly found in small private aircraft. While a suitable light source will be described herein, a more complete description of such a source may be found in copending application, Ser. No. 873,928, filed Nov. 4, 1969, by Norman J. Schuster et al. The instrument panel may be divided into three sections, a left section 11 and a right section 12, each containing a multiple of instruments 13; while a middle section 14 contains communication apparatus. As viewed in FIG. 1, a pilot would normally be seated in front of the left section 11. A flight control wheel (not shown) extends through a semicircular opening 15 for use by the pilot for controlling the aircraft. A copilot is normally seated in front of the right section 12 and is able to control the aircraft with a second flight control wheel (not shown) extending through a second semicircular opening 16. As noted in FIG. 1, there are instruments situated along the entire width of the instrument panel; each of these instruments must be viewable from either the pilot's or the copilot's position.

As mentioned above, light reflected from the instruments 13 causes difficulty in readability at the various viewing angles which might be expected knowing the locations of the pilot's and copilot's heads. In an effort to set criteria to judge the suitability of various designs for instrument panels, aircraft companies have developed readability standards within certain angle limitations for the instruments. For example, FIG. 2 illustrates the angle at which a copilot (depicted by an eye 17) would view one of the instruments 13. In one particular aircraft, using an experimental instrument panel, the copilot's head is positioned approximately 19 inches from the instrument panel and approximately 32 inches away from the farthest column of instruments of the panel. Thus, angle $\alpha$, the angle between a normal (designated 19) to the instrument 13 and an imaginary line of sight (designated 18) is equal to about 60°. Thus, there should not be any extraneous reflected light from the instrument or the instrument-lighting system within a 2 $\alpha$ or 120° elliptical cone generated about the normal to the instrument.

In order to overcome the disadvantages of the lighting art, the lighting system as illustrated in FIG. 3 was developed. As shown, the instrument panel comprises a support plate 20 and a cover plate 22; the plates may be closely spaced. An experimental system had a ¼-inch spacing. A light source 24 is positioned adjacent the support plate 20 and connected through an opening 23 in the support plate 20 to an electrical power source (not shown). A removable cover plug (not shown) may be provided to act in conjunction with the cover plate 22 to allow access for replacement of the light source. The support plate 20 and the cover plate 22 have openings 26 and 28, respectively, for the viewing of an instrument; the instrument is located away from the cover plate 22; that is, it is behind the cover and support plates when viewing the instrument panel from the position of the pilot or copilot. As contemplated in a preferred embodiment, the support plate 20 may be an existing instrument panel with the cover plate and the light source mounted over or in front of the instrument panel. The diameter of the openings will depend upon the instrument face diameter and will probably be 1, 2 or 3 inches, with 3 inches being the most common.

The instrument 13 comprises a housing 30 which is supported by the support plate 20 by any suitable means, usually by being bolted together, an instrument lens 32 and an instrument pointer 34 which is pivotally mounted on a shaft 36 which is connected to an element or elements (not shown) responsive to physical changes occurring within or about the aircraft. The instrument pointer 34 will act in conjunction with a dial 40. It is to be noted that the description of the above-mentioned instrument is not to limit the invention as other types and forms of instruments may be substituted.

A refractor 42 is positioned between the cover plate 22 and the support plate 20 and forms a substantially flush vertical surface with the openings 26 and 28 as depicted in FIG. 3. As can be readily seen, light from the light source 24 is directed between the cover plate and the support plate to the refractor 42 where the light is refracted toward the instrument lens 32 which also refracts the light so as to have it impinge upon the instrument pointer 34 and the dial 40.

Referring now to FIG. 4, another embodiment of the lighting system is illustrated. Generally, the embodiment is very similar to that shown in FIG. 3 and comprises a support plate 20' having an opening 26', a cover plate 22' having an opening 28', a light source 24', an instrument housing 30', an instrument lens 32' and a refractor 42'. It is noted that the light source 24' has been positioned in a slightly different way than the FIG. 3 embodiment and is connected to a printed circuit 50 which is attached to a surface 51 of the cover plate 22'. The surface 51 and a surface 52 of the support plate 20' are covered with a nonlight-reflecting material 54 such as black flocking. Flocking may be defined generally as very short or pulverized fibers.

The use of the flocking results in a greatly improved lighting system even when compared to a system having flat black paint covering the surfaces 51 and 52. Since little or no light is reflected from the surfaces 51 and 52, that light which is transmitted through the refractor 42' to the instrument is incident upon the refractor directly from the light source 24'. As depicted in FIG. 3, the light incident upon the refractor is relatively horizontal; light which may prove troublesome if incident upon the refractor 42' at a glancing angle by being reflected from surface 51 or 52 is virtually eliminated, thereby minimizing unwanted extraneous light.

The flocking may be applied directly to the surfaces 51 and 52 (or the printed circuit 50) by bonding techniques or may be purchased in a form having a pressure-sensitive backing for allowing easy and quick application. It is to be noted that the interior surfaces of the cover plate 22 and the support plate 20 in the FIG. 3 embodiment are also covered with a nonlight-reflecting material, however due to the small scale of the figure, the covering material is not depicted.

Referring now to FIG. 5, there is illustrated in more detail a cross section view of a refractor 42'. The refractor material may be of any suitable plastic such as acrylic resin wherein the plastic has an index of refraction of approximately 1.45 to 1.50. As in FIG. 4, the refractor 42' is situated between a support plate 20' and a cover plate 22'. The refractor 42' is of an annular geometry having a cross section with four surfaces. A first surface or inner surface 70 forms a flush boundary with an opening 26' of the support plate 20' and an opening 28' of the cover plate 22'. The inner surface 70 is substantially perpendicular to an instrument lens 32' so that a substantially perpendicular wall surrounds the instrument lens to prevent light, emanating from one portion of the inner surface 70, from striking and reflecting off another portion of the inner surface 70 into the eyes of a viewer. Thus, it is noted that the perpendicular disposition of the inner surface 70 is superior to a slanted surface from which light could be reflected into the eyes of a viewer or (if slanted in a reverse fashion) create a shadow portion on the instrument dial. It should also be noted that light transmitted through the refractor 42' which is incident upon the inner surface 70 at an angle above the horizontal (as viewed in FIG. 5 where a horizontal line would be the equivalent of a normal to the surface 70) is reflected at a larger angle below the horizontal or normal so as to be incident upon the instrument lens 32'. The preceding description may best be illustrated by line 72 which is used to imitate the path light would take from a source to the instrument. The normal to surface 70 is depicted by a line designated 74. As is well known to those skilled in the optical field, light entering air after traveling through a medium having an index of refraction greater than 1.00 will be deflected at the surface away from the normal. Thus, angle $\beta_2$ is greater than angle $\beta_1$.

Opposite the inner surface 70 of refractor 42' is a second surface or outer surface 76 which is oblique to the surface 70 such that if the surfaces 70 and 76 were imagined to be extended beyond the cover plate 22' as shown by the phantom lines an acute angle would be formed. The precise angle formed would depend upon a number of parameters. The three following parameters are recited for example and are not to be taken as the only parameters of concern; the distance between the cover plate 22' and the support plate 20', the distance between the inner surface 70 and the outer surface 76, and the distance of the light source 24' (FIG. 4) from the outer surface 76.

A similar analysis to that disclosed above may be performed on the light ray 72 as it passes through surface 76. However, since the ray of light is passing from an environment having a relatively low index of refraction (air) into an environment having a relatively high index of refraction, the angles relative to a normal 78 to the surface 76 would be the reverse of that disclosed for surface 70; that is, the angle between the ray of light 72 and the normal 78 in the air environment, designated $\beta_3$ is greater than the angle between the ray of light and the normal in the refractor environment, designated $\beta_4$. Thus, the path of ray 72 which is initiated as a horizontal ray when illustrated in FIG. 5 is incident upon the instrument lens 32'.

The two remaining surfaces of the refractor 42' are a third surface or top surface 79 and a fourth surface or bottom surface 80. Top surface 79 forms an obtuse angle with the inner surface 70 while the bottom surface 80 forms an acute angle with the inner surface 70. Once again, the precise angle is dependent upon the dimensional parameters already discussed. However, top surface 79 is made sufficiently oblique so that light which strikes the outer surface 76 at too great an angle to be refracted directly to the inner surface 70 will be reflected off the surface 79 to the surface 70. If the surface 79 were horizontal the possibility would exist that light would be refracted toward the viewer rather than the instrument lens 32'. Likewise, the obliqueness of the bottom surface 80 is determined by the angle of light incident upon surface 76. If the light impinges upon surface 76 above a normal the light will be refracted to surface 80 and then reflected at a sharp angle in a direction away from the instrument panel out toward the viewer. Thus, surface 80 is sufficiently oblique to prevent light, striking surface 76 above a normal to the surface from being reflected from surface 80 and refracted through surface 70 toward the viewer; As an added precaution, an annular wedge 82 of nonlight-reflecting material such as black flocking on a resilient base may be provided to absorb any light which may be incident upon it and act to position and retain the refractor while preventing the transmission of vibration to the refractor.

An annular wedge (not shown) similar to the annular wedge 82 may be positioned against the third or top surface 79 of the refractor 42' if the cover plate did not have a slanted lip 86 but was entirely planar. However, it has been found that better overall instrument visibility can be obtained by providing the slanted lip 86 to the cover plate 22' immediately about the opening 28'. By way of example, it has been found that with a refractor having the following angles between surfaces: 90° between the inner surface 70 and the top surface 79, 65° between the inner surface 70 and the bottom surface 80, 100° between the bottom surface 80 and the outer surface 76 and 105° between the outer surface 76 and the top surface 79, a horizontal light ray entering the refractor will be refracted so that the following angles are made with the normals 78 and 72: $\beta_3=15°, \beta_4=10°, \beta_1 5$ and $\beta_2 7°$.

It is to be understood that, although a preferred embodiment of the invention has been disclosed herein for purposes of illustration, various changes could be made in the form, detail and proportion of various parts of the embodiment without departing from the scope of the invention; for example, the refractor 42' may have more than four lateral surfaces, depending upon ease of manufacture and the dimensional parameters of the system into which the refractor is placed and any suitable material other than flocking may be used to cover surfaces 51 and 52.

What is claimed is:

1. A lighting system including a light source mounted adjacent a support plate having at least one opening for the viewing of an instrument mounted therein, comprising
    a cover plate positioned generally parallel to and spaced from said support plate, said cover plate having at least one opening aligned with said opening in said support plate;
    at least one light-transmitting refractor for refracting light from said light source mounted between said support and cover plates and conforming to said opening;
    said refractor having a first inner surface immediately adjacent said opening, a second outer surface opposite said first inner surface and oblique to said first inner surface wherein said first inner and second outer surfaces form an acute angle if extended, and a bottom surface forming an acute angle with said first inner surface and an acute angle with the plane of said support and cover plates, for refracting said light from said light source toward said instrument while that portion of said light reflected from said bottom surface of said refractor is reflected toward said first inner surface and then refracted toward said instrument.

2. A lighting system as claimed in claim 1, additionally comprising:

a wedge of nonreflecting material mounted between said bottom surface of said refractor and said support plate.

3. A lighting system as claimed in claim 1, additionally comprising:

said light source mounted between said support and cover plates; and nonreflecting flocking material attached to the inner surfaces of said support and cover plates for absorbing said light from said light source not directed toward said refractor.

4. A lighting system as claimed in claim 1, additionally comprising:

said refractor having a top surface forming an obtuse angle with said first inner surface and an acute angle with the plane of said support and cover plates for reflecting said light from said light source toward said first inner surface where said light is refracted toward said instrument; and said cover plate having a slanted lip portion adjacent said top surface to provide viewing access to said instrument.

5. A lighting system as claimed in claim 4, wherein:

said first inner surface of said refractor is substantially perpendicular to the plane of said support and cover plates.

6. A lighting system including a light source mounted between adjacent, parallel support and cover plates having aligned openings for mounting therein an instrument to be illuminated, the improvement comprising:

refractor means mounted between said support and cover plates and conforming to said opening therein for completely surrounding said instrument; and said refractor means having a trapezoidal cross section wherein the major base portion thereof is arranged at an acute angle to said support plate and substantially parallel to the incident light from said light source.

* * * * *